United States Patent [19]

Robitschko et al.

[11] Patent Number: 4,805,233

[45] Date of Patent: Feb. 14, 1989

[54] ANTI-THEFT ARRANGEMENT FOR A SOUND-REPRODUCING APPARATUS INSTALLED INTO A MOUNTING COMPARTMENT OF A MOTOR VEHICLE

[75] Inventors: Peter Robitschko; Rudi Kneib; Marko Polic, all of Sindelfinen, Fed. Rep. of Germany

[73] Assignee: Daimler-Benz Aktiengesellschaft, Stuttgart, Fed. Rep. of Germany

[21] Appl. No.: 60,315

[22] Filed: Jun. 10, 1987

[30] Foreign Application Priority Data

Jun. 10, 1986 [DE] Fed. Rep. of Germany ....... 3619523

[51] Int. Cl.$^4$ .............................................. B60R 25/00
[52] U.S. Cl. ..................................... 455/346; 340/63; 340/568; 307/10 AT
[58] Field of Search ............................... 455/345–349; 340/63, 568, 572, 825.25, 570; 307/10 AT

[56] References Cited

U.S. PATENT DOCUMENTS

| 3,917,372 | 11/1975 | Selinko | 455/346 |
| 4,035,765 | 7/1977 | Wenner et al. | 340/63 |
| 4,211,995 | 7/1980 | Smith | 340/63 |
| 4,232,288 | 11/1980 | Masterman | 340/568 X |
| 4,481,512 | 11/1984 | Tscheulin et al. | 455/346 |
| 4,679,026 | 7/1987 | Knakowski et al. | 455/346 |
| 4,758,817 | 7/1988 | Akiyama | 455/346 |

Primary Examiner—Robert L. Griffin
Assistant Examiner—Curtis Kuntz
Attorney, Agent, or Firm—Barnes & Thornburg

[57] ABSTRACT

An anti-theft arrangement for a sound-reproducing apparatus, such as a radio, installed into a mounting compartment of a motor vehicle whose contact arrangement assures a high functioning reliability both during the driving operation as well as during service and installation operation as also during unauthorized removal of the apparatus.

9 Claims, 1 Drawing Sheet

U.S. Patent  Feb. 14, 1989  4,805,233
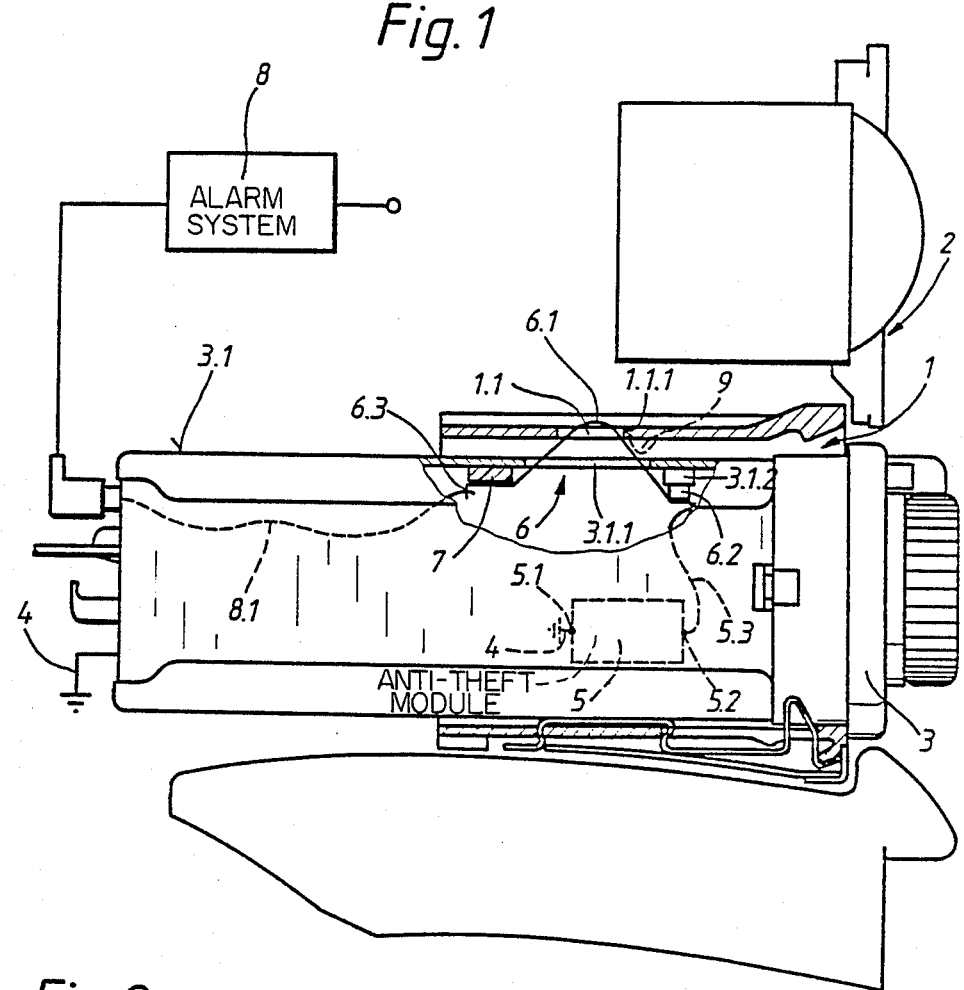
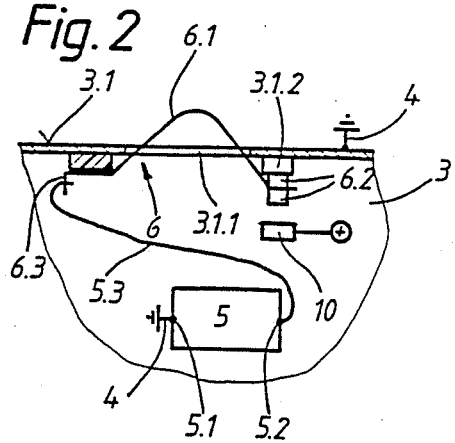
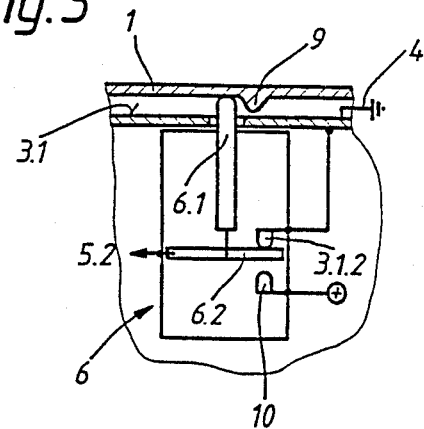

ANTI-THEFT ARRANGEMENT FOR A SOUND-REPRODUCING APPARATUS INSTALLED INTO A MOUNTING COMPARTMENT OF A MOTOR VEHICLE

BACKGROUND AND SUMMARY OF THE INVENTION

The present invention relates to an anti-theft arrangement for a sound-reproducing apparatus installed into a mounting compartment of a motor vehicle whose housing is electrically connected with ground and into which an anti-theft module is integrated whose one input is connected with ground and whose other input, in the installed condition of the sound-reproducing apparatus, is connected by way of a contact of a contact element with the housing connected with ground and in case of unauthorized removal of the sound-reproducing apparatus and therewith during the ensuing interruption of the ground connection between the contact and the housing, is connected with the plus potential for the activation of the anti-theft module.

In an anti-theft arrangement of the aforementioned type (Mercedes-Benz vehicles Type 124, 126 . . . with installed radio) a shaped spring of flat band material is arranged as contact element at the mounting compartment and lying in the compartment opening which in the installed condition of the radio contacts the housing thereof connected with ground. A set of cables is attached to the spring from which a cable leads to a break-in-anti-theft-alarm system (EDW-installation) arranged in the vehicle and a cable leads to an input of the anti-theft module by way of a plug-in connection at the radio.

In contrast to this known arrangement, the present invention is concerned with the task to so construct the anti-theft arrangement that the safety against malfunctioning is further increased both during the driving operation as also in case of authorized assembly and service operations.

The underlying problems are solved according to the present invention in that the contact element with its contact is arranged inside of the housing and only an actuating part of the contact element protrudes out of the housing which, in the installed condition of the sound-reproducing apparatus engages from behind a detent in the gap between the housing and the mounting compartment and arranged at the latter, by means of which the ground connection of the contact to the housing is interrupted by way of the actuating part in case of removal of the sound-reproducing apparatus.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 1 is a schematic view of a radio with an anti-theft arrangement installed in the mounting compartment of an instrument panel of a motor vehicle in accordance with the present invention;

FIG. 2 is a partial schematic view of a modified embodiment of a circuit arrangement in accordance with the present invention; and FIG. 3 is a partial schematic view of a still further modified embodiment in accordance with the present invention illustrating a contact element constructed as push button switch.

DETAILED DESCRIPTION OF THE DRAWINGS

Referring now to the drawings wherein like reference numerals are used throughout the various views to designate like parts, and more particularly to FIG. 1, a radio 3 is installed in the mounting compartment generally designated by reference numeral 1 of an instrument panel generally designated by reference numeral 2 of a motor vehicle. The housing 3.1 of the radio is connected with ground 4; one input 5.1 of an anti-theft module 5 of known construction installed in the radio is also connected with ground 4. Furthermore, a contact element generally designated by reference numeral 6 is arranged in the radio which is constructed as leaf spring—preferably provided with an insulation. The contact element 6 is secured on the one hand by way of an insulating disk 7 at the inside of the housing and extends with a V-shaped arcuate portion serving as actuating part 6.1 through a housing aperture 3.1.1 in such a manner that the tip of the arcuate portion can engage in a rectangular aperture 1.1 of the mounting compartment 1 whose dimensions are so selected that the wall 1.1.1 of the aperture 1.1 serves as shifting element with respect to the actuating part 6.1. At its other end, the contact element 6 carries a contact 6.2 which under the prestress of the contact element 6 rests on a ground contact 3.1.2 on the inside of the housing. The contact 6.2 is connected by way of an electrical connection 5.3 with the other input 5.2 of the anti-theft module 5 whereas an electric line 8.1 connected with an EDW-system 8 (break-in, anti-theft alarm system) is connected to the other end of the contact element 6 by way of a connecting lug 6.3.

In the installed condition of the radio 3, the anti-theft module 5 is connected to ground 4 both at its input 5.1 as well as at its input 5.2 by way of the connection 5.3 and the contacts 6.2 and 3.1.2. The EDW-system 8 is also connected to ground 4 by way of the connection 8.1. If the driver has now armed the EDW-system 8 when leaving the vehicle, and if an unauthorized person now seeks to remove the radio 3, then the actuating part 6.1 runs up along the wall 1.1.1 when pulling the radio 3 out of the mounting compartment 1, as a result of which the actuating part 6.1 is displaced in the direction toward the housing interior. As a result thereof, the contact 6.2 lifts off from the ground contact 3.1.2 and interrupts the ground connection to the housing 3.1 and therewith also the ground connection of the EDW-system 8. As a result thereof, the EDW-system 8, on the one hand, sets off an alarm and, on the other hand, it applies by an internal switching operation plus potential to the line 8.1 which also reaches the input 5.2 of the anti-theft module 5 by way of the contact element 6 and the connection 5.3. As a result of the change in potential at the input 5.2 from ground to plus potential, the anti-theft module 5 is activated which renders the radio inoperable, i.e., renders the same without value for the unauthorized person. Only authorized persons can again render the radio operable by appropriate measures.

Additionally, FIG. 1 illustrates as an alternative that the shifting element for the actuating part 6.1 can also be constructed as cam 9.

Whereas in FIG. 1 an EDW-system is incorporated into the anti-theft arrangement, FIG. 2 illustrates in partial view an arrangement without EDW-system. Differing from FIG. 1, the connection 5.3 is now secured thereby at the connecting lug 6.3 of the contact element 6 so that the input 5.2 of the anti-theft module 5 is connected to ground 4 by way of the connection 5.3, the contact element 6 and the contacts 6.2 and 3.1.2. Additionally, a further contact 10 carrying plus potential is provided in the housing 3.1 against which the contact 6.2 is placed when the radio is removed without authorization. As a result thereof, plus potential again reaches the input 5.2 of the anti-theft module 5 whereby the latter is activated.

Even though the contact element is illustrated in the figures as spring element, the contact element could also be constructed—as shown in FIG. 3—as push-button switch with a plunger as actuating part.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An anti-theft arrangement for a sound-reproducing apparatus including a housing means installed in a mounting compartment of a motor vehicle, the housing means for the sound-reproducing apparatus being electrically connected with ground, an anti-theft module means integrated into the sound-reproducing apparatus for disabling said sound-reproducing apparatus when activated, said anti-theft module means having a first input connected with ground and a second input operatively connected, in the installed condition of the sound-reproducing apparatus, with the housing means by a contact element, and means for operatively connecting said second input of the anti-theft module means with positive potential for the activation of said anti-theft module means during unauthorized removal of the sound-reproducing apparatus and therewith during the ensuing interruption of the ground connection between the contact means and the housing means, the contact element being arranged with its contact means inside of the housing means and including an actuating means, only the actuating means protruding out of the housing means, the actuating means, in the installed condition of the sound-reproducing apparatus, engaging from behind a shifting means for shifting said actuating means when said housing means moves relative to said mounting compartments, said shifting means being arranged in a gap between the housing means and the mounting compartment and arranged at the mounting compartment, the ground connection of the contact means to the housing means being interrupted during removal of the sound-reproducing apparatus by the actuating means.

2. An anti-theft arrangement according to claim 1, wherien the contact element is constructed as leaf spring with a V-shaped arcuate portion as actuating means protruding out of the housing means, one end of the leaf spring being secured at the housing means insulated with respect thereto and the other end of the leaf spring carrying the contact means.

3. An anti-theft arrangement according to claim 2, wherein the leaf spring is prestressed in the direction of the shifting means corresponding to the actuating means.

4. An anti-theft arrangement according to claim 2, wherein at least one end of the leaf spring is also a connecting lug.

5. An anti-theft arrangement according to claim 2, wherein the actuating means engages a substantially rectangular aperture of the mounting compartment, and a wall of the aperture forms the shifting means.

6. An anti-theft arrangement according to claim 1, wherein the shifting means is a cam in the gap between the housing means and the wall of the mounting compartment and is arranged at the mounting compartment.

7. An anti-theft arrangement according to claim 2, wherein one end of the leaf spring is additionally operatively connected by way of an electric line with a break-in-anti-theft warning system.

8. An anti-theft arrangement according to claim 1, wherein the contact element is a push-button with a plunger as actuating means.

9. An anti-theft arrangement according to claim 1, wherein the actuating means engages a substantially rectangular aperture of the mounting compartment, and a wall of the aperture forms the shifting means.

* * * * *